United States Patent [19]
Yoshii

[11] Patent Number: 5,246,264
[45] Date of Patent: Sep. 21, 1993

[54] SIDE BODY STRUCTURE OF AUTOMOTIVE VEHICLE

[75] Inventor: Noboru Yoshii, Hiroshima, Japan

[73] Assignee: Mazda Motor Corporation, Hiroshima, Japan

[21] Appl. No.: 922,605

[22] Filed: Jul. 31, 1992

[30] Foreign Application Priority Data

Aug. 2, 1991 [JP] Japan .................. 3-194167

[51] Int. Cl.⁵ ............................................ B62D 25/08
[52] U.S. Cl. ..................... 296/203; 296/209; 296/202; 296/188
[58] Field of Search ............... 296/203, 209, 202, 188, 296/189, 185

[56] References Cited

U.S. PATENT DOCUMENTS

| | | | |
|---|---|---|---|
| 4,552,400 | 11/1985 | Harasaki et al. | 296/185 |
| 4,944,553 | 7/1990 | Medley et al. | 296/188 |
| 4,950,025 | 8/1990 | Yoshii | 296/195 |
| 5,042,872 | 8/1991 | Yoshii | 296/203 |

FOREIGN PATENT DOCUMENTS 61-41083 3/1986 Japan .
61-51187 4/1986 Japan .

*Primary Examiner*—Robert R. Song
*Attorney, Agent, or Firm*—Keck, Mahin & Cate

[57] ABSTRACT

A side body structure of a vehicle includes a side sill and a roof side rail, both of which extend in a lengthwise direction of a vehicle body, and front and center pillars which extend between and connect the side sill and the roof side rail so as to define a generally rectangular front door opening in the side body. The side body structure is reinforced by a sill reinforcement extending in the lengthwise direction of the vehicle, inside of the side sill, and pillar reinforcements extending between the side sill and the roof side rail, inside the front pillar and the center pillar, respectively. The sill reinforcement is secured, at its front end, to the front pillar reinforcement and, at its rear end, to the center pillar reinforcement.

12 Claims, 3 Drawing Sheets

SIDE BODY STRUCTURE OF AUTOMOTIVE VEHICLE

BACKGROUND OF THE INVENTION

1. Field of the Invention

This invention pertains to part of the body structure of a vehicle and, more particularly, to the side structure of a vehicle body.

2. Description of Related Art

Typically, a vehicle body side structure includes a side sill shaped in a form of a boxed-channel. The side sill extends in a lengthwise direction of the vehicle body, i.e., from the front to the back of the vehicle. In order to improve the torsional stiffness of the vehicle body, a side sill reinforcement is provided in the side sill for reinforcement of the side sill. Such a vehicle body is well known from, for instance, Japanese Unexamined Utility Model Publication No. 61-51,187.

In addition to reinforcing the side sill, a center pillar may be reinforced by a pillar reinforcement. A vehicle body structure having such a pillar reinforcement is well known from, for instance, Japanese Unexamined Utility Model Publication No. 61-41,083. However, the reinforced center pillar can still be too low in structural stiffness to adequately withstand torsional loads transmitted to the vehicle body through the sill.

Side body structures of this kind, in which a side sill and a center pillar are reinforced independently from each other by separate reinforcements, are generally insufficient in stiffness to withstand the energy of a collision impact. Consequently, it is hard to prevent deformation of the vehicle body and to prevent noise caused from vibrations of the vehicle body.

SUMMARY OF THE INVENTION

It is an object of the present invention to provide a body structure of a vehicle which is improved in structural stiffness and which is simple in structure.

It is another object of the present invention to provide a body structure of a vehicle which prevents both noise caused from vibrations of a vehicle body and deformation of a vehicle body.

A side body structure of a vehicle according to the present invention includes a side sill and a roof side rail, both of which extend in a lengthwise direction of the vehicle body. The side body structure also includes front and center pillars which extend between and connect the side sill and the roof side rail so as to define a generally rectangular front door opening in the side body. The side body structure of the vehicle is reinforced by a sill reinforcement, extending in the lengthwise direction inside the side sill, and pillar reinforcements, extending between the side sill and the roof side rail inside the front pillar and the center pillar. The sill reinforcement is secured at its front end to the front pillar reinforcement and at its rear end to the center pillar reinforcement.

In a particular embodiment of the present invention, the side sill includes outer and inner side sill frames connected to each other so as to form a hollow side sill within which the sill reinforcement is incorporated.

The sill reinforcement includes a reinforcement frame having a cross section which is convex relative to the outer side sill frame; such a cross section may be generally trapezoidal or C-shaped. Front and rear corner trim extensions define lower corners of a front door opening. Each of the corner trim extensions is formed integrally with the sill reinforcement.

BRIEF DESCRIPTION OF THE DRAWINGS

The above and other objects and features of the present invention will be apparent to those skilled in the art from the following description of preferred embodiments thereof when considered in conjunction with the appended drawings, in which.

DESCRIPTION OF THE PREFERRED EMBODIMENT

Figure 1:
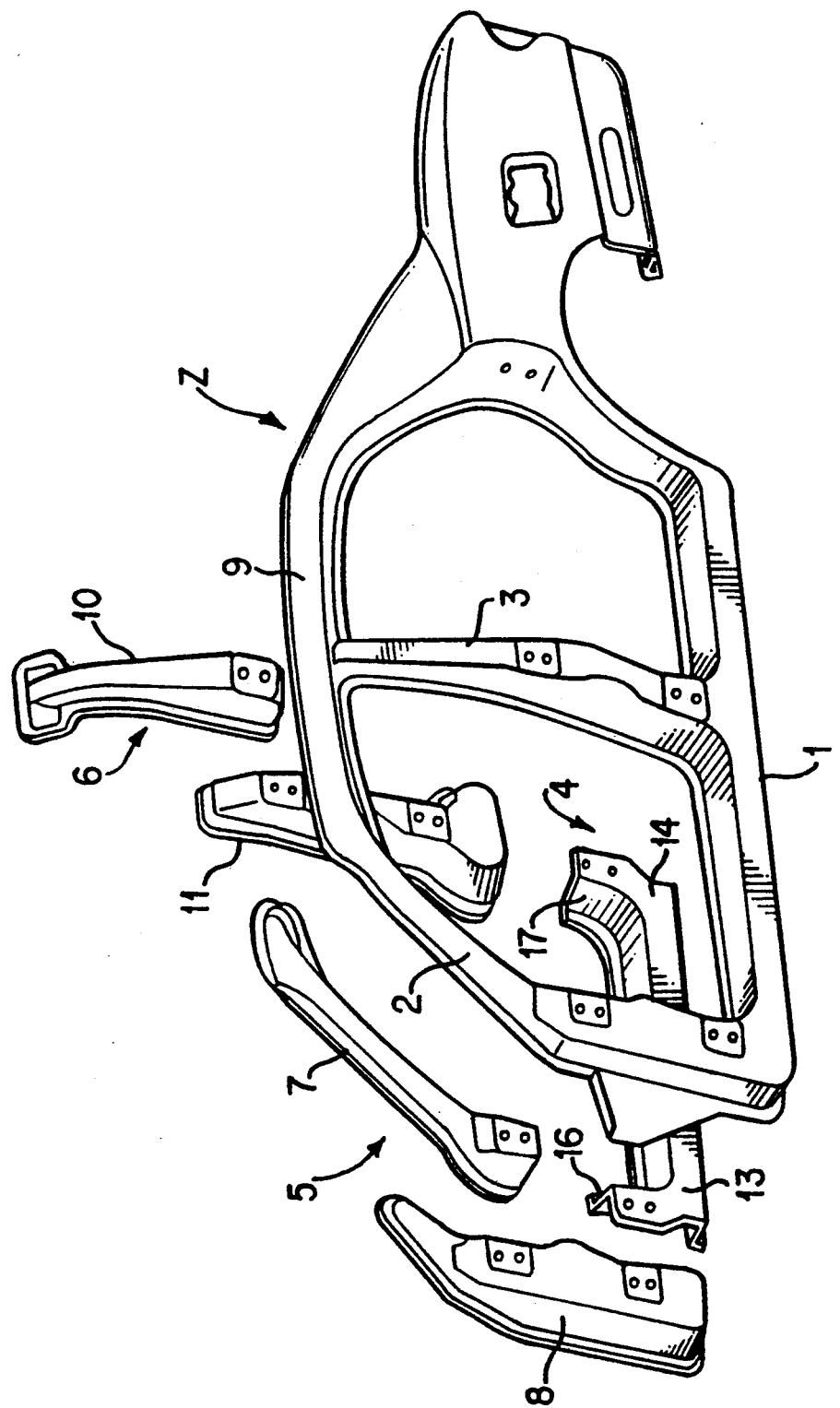
FIG. 1 is an exploded perspective view of a side body structure in accordance with a preferred embodiment of the present invention.
Figure 2:
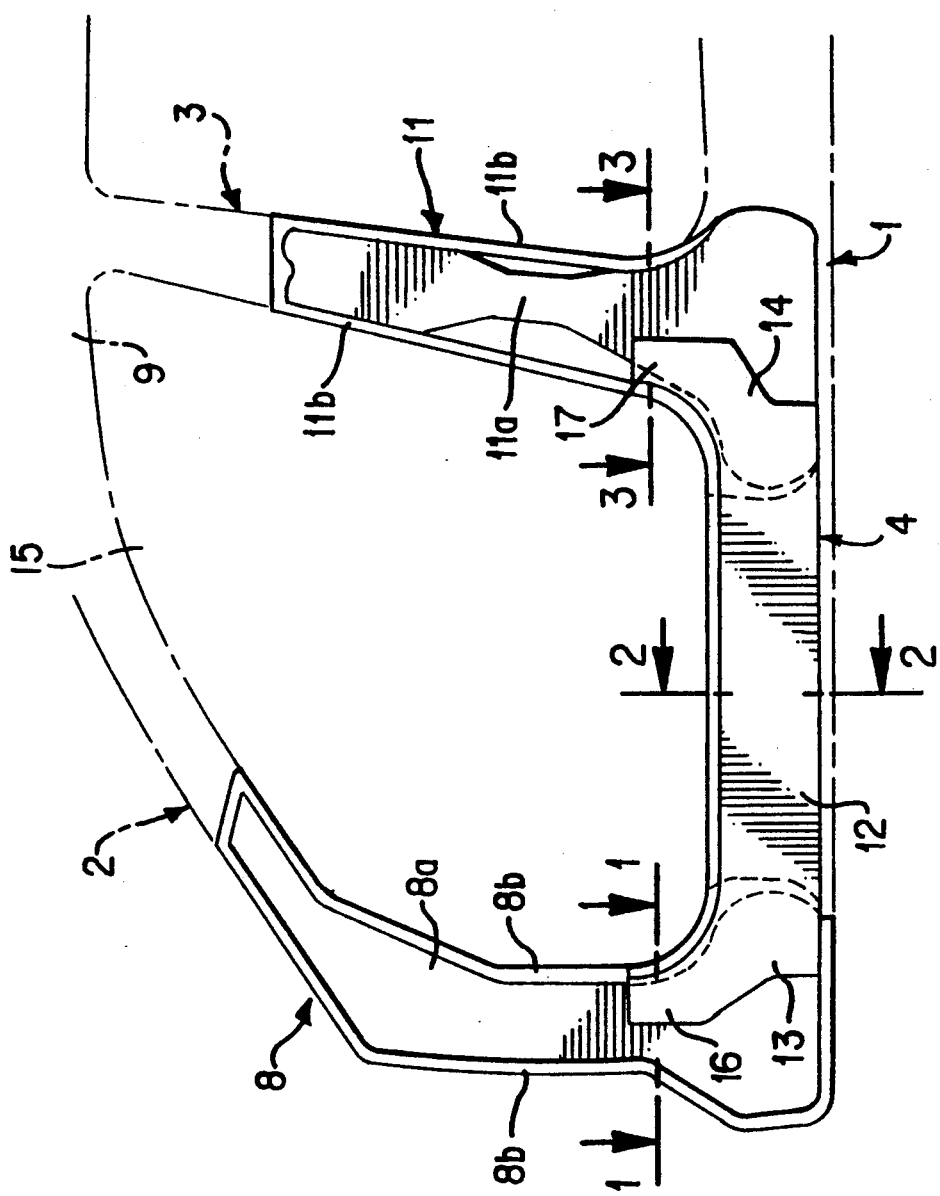
FIG. 2 is a side view showing reinforcements incorporated in the side body structure.

Referring to the drawings in detail and, in particular, to FIGS. 1 to 2, a side body section Z of an automotive vehicle body is shown. The side body section Z includes a side sill 1, extending along a lower side of the vehicle body, and a roof side rail 9, extending along an upper side of the vehicle body. Between the side sill 1 and the roof side rail 9, a front pillar 2 and a center pillar 3 are formed so as to define a front door opening 15 between the front and center pillars 2 and 3. The side sill 1 is formed by an outer sill frame 1a and an inner sill frame 1b, which together form a hollow structure. The front pillar 2 may be partly formed integrally with both the side sill 1 and the roof side rail 9 and formed by an outer pillar frame 2a and an inner pillar frame 2b combining to form a hollow structure. Similarly, the center pillar 3, which may be partly formed integrally with the side sill 1 and partly formed integrally with the roof side rail 9, is formed by an outer pillar frame 3a and an inner pillar frame 3b so as to form a hollow structure. Inside the side body section Z, there are provided a sill reinforcement 4, a front pillar reinforcement 5 and a center pillar reinforcement 6.

Figure 3:
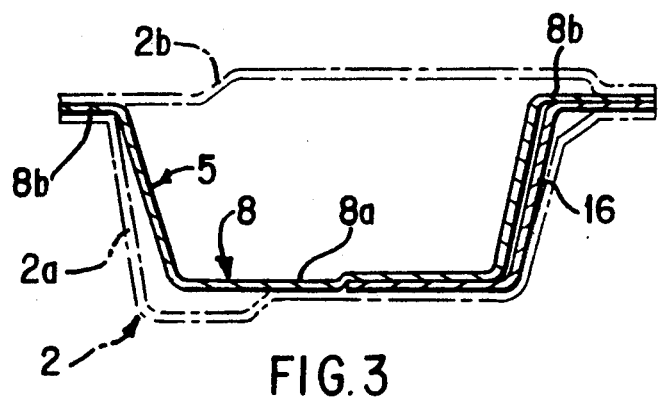
FIG. 3 is a cross-sectional view along line A—A of FIG. 2.

Front pillar reinforcement 5, which is disposed inside the front pillar 2, is formed by an upper reinforcement portion 7, for reinforcing an upper portion of the front pillar 2 integrally formed with the roof side rail 9, and a lower reinforcement portion 8, for reinforcing a lower portion of the front pillar 2 integrally formed with the side sill 1. As is shown in detail in FIG. 3, the lower reinforcement portion 8 is formed by a reinforcement frame 8a having integrally formed side flanges 8b. The reinforcement frame 8a has a U-shaped cross section convex relative to the front pillar 2 as viewed in a transverse direction of the vehicle body. The reinforcement frame 8a is held with its side flanges 8b grasped by and welded or otherwise secured to the outer pillar frame 2a and the inner pillar frame 2b. Further, the reinforcement frame 8a is secured to the outer pillar frame 2a of the front pillar 2. The upper reinforcement portion 7 is secured at its lower end to an upper end of the lower reinforcement portion 8 and is welded at its upper end to a front end of the roof side rail 9.

Figure 4:
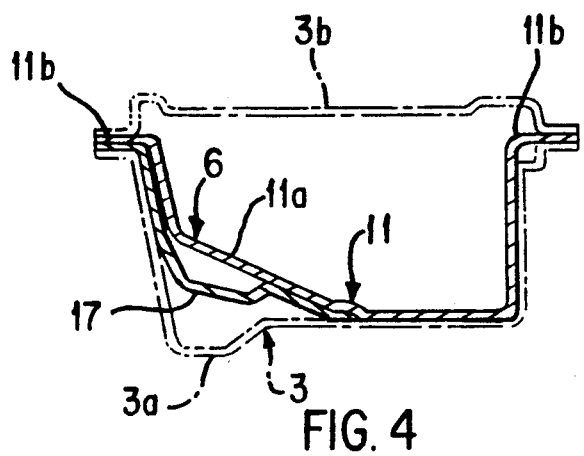
FIG. 4 is a cross-sectional view along line B—B of FIG. 2.

Center pillar reinforcement 6 is formed by an upper reinforcement portion 10 for reinforcing an upper portion of the center pillar 2 and a lower reinforcement portion 11 for reinforcing a lower portion of the center pillar. As is shown in detail in FIG. 4, the lower reinforcement portion 11 is formed by a reinforcement frame 11a, having integrally formed side flanges 11b, which has a U-shaped cross section which is convex relative to the outer pillar frame 3a as viewed in a transverse direction of the vehicle body. The reinforcement frame 11a is held with its side flanges 11b grasped by and welded or otherwise secured to the outer pillar frame 3a and the inner pillar frame 3b. Further, the reinforcement frame 11a is secured to the outer pillar frame 3a of the center pillar 3. The upper reinforcement portion 10 is secured at its lower end to an upper end of the lower reinforcement portion 11 and is welded at its upper end to a middle portion of the roof side rail 9.

Figure 5:
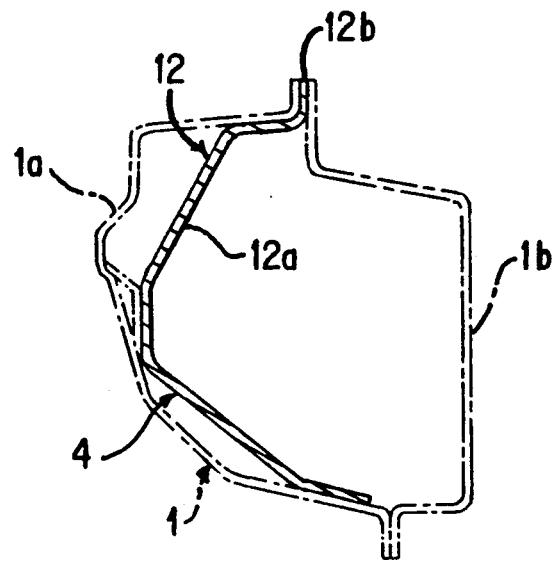
FIG. 5 is a cross-sectional view along line C—C of FIG. 2.

The sill reinforcement 4 includes a reinforcement frame 12, a front frame extension 13 extending upward from a front end of the reinforcement frame 12, and a rear frame extension 14 extending upward from a rear end of the reinforcement frame 12. The side sill reinforcement 4 is welded or otherwise secured to the lower reinforcement portion 11 of the center pillar reinforcement 6 and the lower reinforcement portion 8 of the front pillar reinforcement 5 through the front frame extension 13 and the rear frame extension 14, respectively. As is shown in detail in FIG. 5, the reinforcement frame 12 of the sill reinforcement 4, which has a generally trapezoid-shaped or C-shaped cross section which is convex relative to the outer sill frame 1a as viewed in a transverse direction of the vehicle body, is formed with integrally formed side flanges 12b. The reinforcement frame 12 is held with its side flanges 12 grasped by and welded or otherwise secured to the outer sill frame 1a and the inner sill frame 1b. Further, the reinforcement frame 12 is secured at its middle portion and lower portion to the outer sill frame 1a of the side sill 1.

Side sill 1 is integrally formed with a front flange 16 and a rear flange 17 at the front extension 13 and the rear extension 14, respectively, so as to form trimmed lower end corners of the front door opening 15. The front flange 16 and the rear flange 17 are welded or otherwise secured to a rear outer side of the front pillar reinforcement 5 and a front outer side of the center pillar reinforcement 6, respectively.

The side sill structure, in which the sill reinforcement 4, incorporated within the side sill 1, interconnects the front pillar reinforcement 5 and the center pillar reinforcement 6, provides an increased structural stiffness to the vehicle body against an impact in the event of a car collision. In other words, an external torsional force applied to the sill reinforcement 4 is transmitted to the roof side rail 9 and other structural members through the front pillar reinforcement 5 and the center pillar reinforcement 6, so as to be dispersed over the vehicle body. As a result, in the event of a bump or collision, the vehicle body provides enhanced absorption of vibration or impact, respectively. Hence, absorption of vibration noises is also enhanced. Furthermore, since the side sill 1 is integrally formed with the front flange 16 and the rear flange 17, which are provided in order to form trimmed lower end corners of the front door opening 15, there is provided an increased welding area between the sill reinforcement 4 and the front pillar reinforcement 5 and between the sill reinforcement 4 and the center pillar reinforcement 6. Strong structural connections between reinforcements 4, 5 and 6, therefore, are provided. As a result, since the frame structure for defining the door opening 15 is sufficiently reinforced by the sill reinforcement 4, the front pillar reinforcement 5 and the center pillar reinforcement 6, the door frame structure and a door (not shown) are effectively protected from deformation in the event of a car collision.

Securing the reinforcement frame 12 of the sill reinforcement 4 to the outer sill frame 1a of the side sill 1 at its middle portion and lower portion provides a large area of attachment between the two frames 1a and 12a so as to enhance the structural stiffness of the side sill 1. Furthermore, although the reinforcement frame 12 of the sill reinforcement 4 is shaped convexly relative to the outer sill frame 1a and is located along and secured to the outer sill frame 1a, the front and rear extensions 13 and 14 of the reinforcement frame 12 are allowed to be located along and properly secured to the front pillar reinforcement 5 and the center pillar reinforcement 6, respectively, without increasing cross sectional areas of the reinforcement frame 12 and transitional portions between the reinforcement frame 12 and the front and rear extensions 13 and 14.

It is to be understood that the front and rear extensions 13 and 14 of the reinforcement frame 12 may be secured to the rear inner side of the front pillar reinforcement 2 and the front inner side of the center pillar reinforcement 3, respectively, instead of the rear outer side of the front pillar reinforcement 2 and the front outer side of the center pillar reinforcement 3.

It is also to be understood that although a preferred embodiment of the present invention has been described in detail, various other embodiments and variants may occur to those skilled in the art. Any such other embodiments and variants which fall within the scope and spirit of the invention are intended to be covered by the following claims.

What is claimed is:

1. In a side body structure of a vehicle body including a side sill and a roof side rail, both of which extend in a lengthwise direction of the vehicle body, and front and center pillars which extend between and connect the side sill and the roof side rail so as to define a generally rectangular front door opening in the vehicle body, the improvement comprising:

a sill reinforcement extending in said lengthwise direction inside said side sill;

a front pillar reinforcement disposed inside the front pillar and connected at one end to said side sill and connected to the roof side rail at its other end;

a center pillar reinforcement disposed inside the center pillar connected at one end to said side sill and connected at its other end to the roof side rail; and securing means for securing said sill reinforcement at its front end to said front pillar reinforcement and at its rear end to said center pillar reinforcement.

2. In a side body structure as defined in claim 1, wherein said securing means comprises a front extension and a rear extension formed integrally with said sill reinforcement.

3. In a side body structure as defined in claim 1, wherein said sill reinforcement comprises a reinforcement frame having a cross section convex relative to said side sill and front and rear corner trim extensions for defining lower corners of the front door opening, each of said corner trim extensions being formed integrally with said sill reinforcement.

4. In a side body structure as defined in claim 1, wherein said side sill comprises outer and inner side sill frames connected to each other so as to form a hollow side sill.

5. In a side body structure as defined in claim 4, wherein said sill reinforcement comprises a generally trapezoid-shaped frame convex relative to the outer side sill frame and side sill flanges integrally formed with said generally trapezoid-shaped frame, said side sill flanges being grasped between and secured to said outer and inner side sill frames.

6. In a side body structure as defined in claim 5, wherein said generally trapezoid-shaped frame is secured to said outer side sill frame.

7. In a side body structure as defined in claim 1, wherein the front pillar comprises outer and inner front pillar frames connected to each other so as to form a hollow front pillar.

8. In a side body structure as defined in claim 7, wherein said front pillar reinforcement comprises a generally U-shaped front pillar frame and front pillar flanges integrally formed with said generally U-shaped front pillar frame, said front pillar flanges being grasped between and secured to said outer and inner front pillar frames.

9. In a side body structure as defined in claim 8, wherein said generally U-shaped front pillar frame is secured to said outer front pillar frame.

10. In a side body structure as defined in claim 1, wherein the center pillar comprises outer and inner center pillar frames connected to each other so as to form a hollow center pillar.

11. In a side body structure as defined in claim 10, wherein said center pillar reinforcement comprises a generally U-shaped center pillar frame and center pillar flanges integrally formed with said generally U-shaped center pillar frame, said center pillar flanges being grasped between and secured to said outer and inner center pillar frames.

12. In a side body structure as defined in claim 11, wherein said generally U-shaped center pillar frame is secured to the outer center pillar frame.

* * * * *